Nov. 9, 1948.  O. STALDER  2,453,349
DRILLING APPLIANCE
Filed Oct. 16, 1946
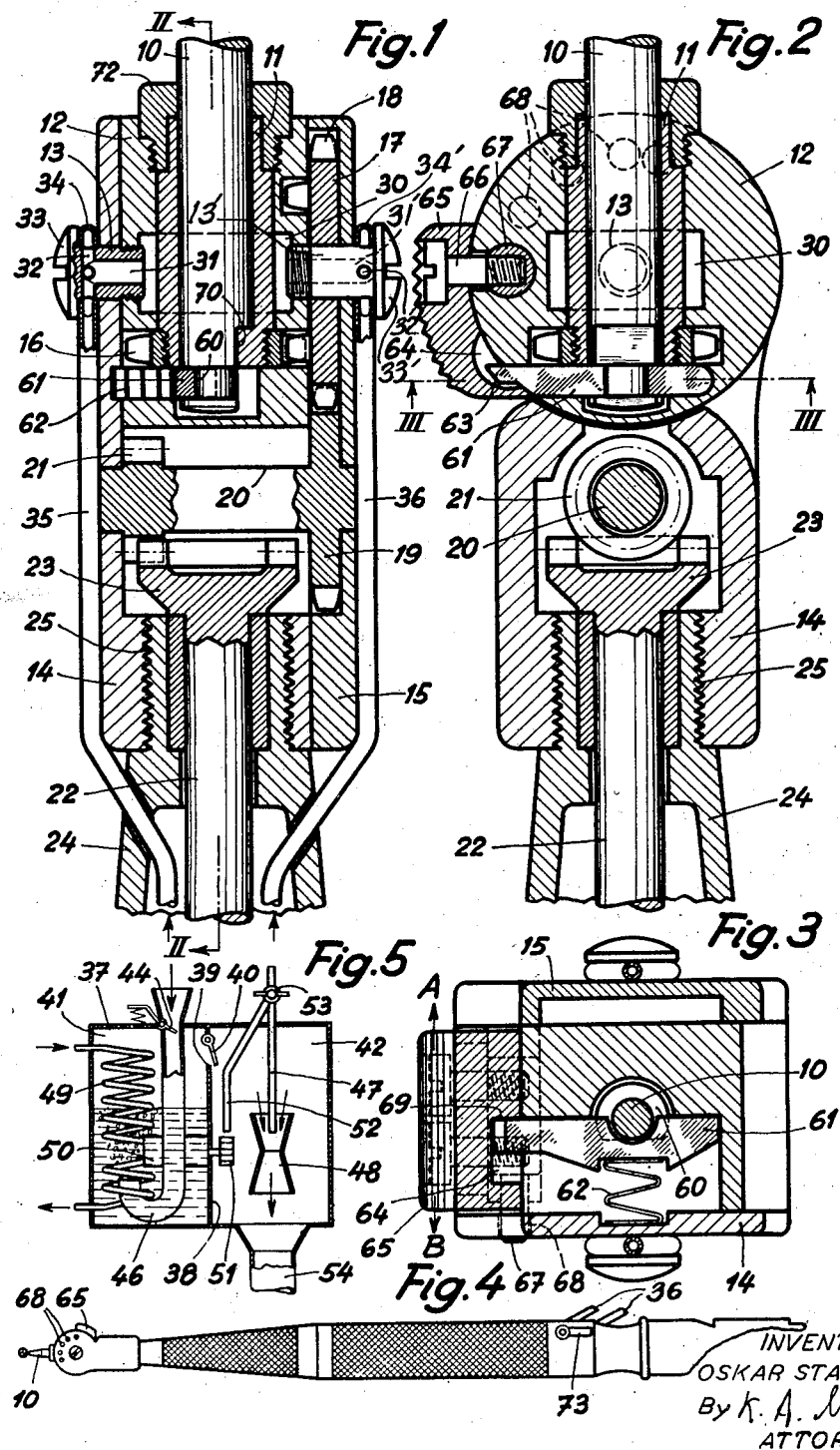
INVENTOR:
OSKAR STALDER
By K. A. Mayr
ATTORNY.

Patented Nov. 9, 1948

2,453,349

UNITED STATES PATENT OFFICE 2,453,349

DRILLING APPLIANCE

Oskar Stalder, Thun, Hunibach, Switzerland, assignor to Fried. Schenk's Wwe. Stadtmuhle Bern, Bern, Switzerland, a firm Application October 16, 1946, Serial No. 703,608
In Switzerland October 19, 1945

5 Claims. (Cl. 32—58)

The present invention relates to a drilling appliance in which a collet containing the drill, mounted in a swivelling drill head, is driven by a live spindle through the medium of a toothed wheel turning on the axis about which the drill head swivels.

Appliances of this kind are known, only the toothed wheel turning on the axis about which the drill head swivels is usually driven directly through the medium of a bevel gear mounted on the live spindle. This arrangement has two disadvantages:

1. The drill revolves in a direction opposite to that of the live spindle, and expensive left hand drills must be used.

2. The toothed wheel turning on the axis about which the drill head swivels must be big enough to allow the head to swivel without hindrance. The appliance is thereby of an undesirably large construction.

These disadvantages can be obviated by the addition of an intermediate toothed wheel between the live spindle and the above mentioned toothed wheel.

The attached drawing shows, by way of example, an embodiment of the appliance according to the present invention.

Fig. 1 is a longitudinal section through the drill head and body of such an appliance in use in dentistry.

Fig. 2 is a section along the line II—II in Fig. 1.

Fig. 3 is a section along the line III—III of Fig. 2.

Fig. 4 is a side view of the drilling appliance.

Fig. 5 is a diagrammatic illustration of a refrigerating device accommodated in the column of the apparatus.

Referring more particularly to Figs. 1 and 2, numeral 10 designates the shank of a dental drill immovably mounted in a collet 11 which revolves in a drill-stock 12. Two pivots 13 and 13' are screwed into the drill-stock 12 at right angles to the axis of rotation of the drill. Pivot 13 extends through a hole in drill head casing 14 and pivot 13' through a cover 15. The circular outside surface of drill-stock 12 is concentric with the pivots 13 and 13', and the drill-stock, together with the collet 11 containing the drill 10, can swivel in members 14 and 15. The collet is prevented from moving axially by a toothed wheel 16 screwed thereunto and fitting in a recess in the drill-stock 12. The teeth of wheel 16 mesh with teeth protruding laterally, in axial direction, from another tooth wheel 17 which revolves about pivot pin 13'. The radial teeth 18 of wheel 17 mesh with the teeth of a further spur wheel 19 mounted on an arbor 20 whose axis is parallel to the swivel axis of the drill head, and which carries radial teeth 21 meshing with the teeth of a wheel 23 which forms the end of live spindle 22. The teeth of wheel 23 extend axially and their flanks extend along radii of wheel 23. Live spindle 22 revolves in a sleeve mounted in a tubular member of which the end portion 24 only is shown and which has a threaded portion 25 to which the casing 14 is screwed.

Member 12 has a central cavity 30. The pivot members 13 and 13' have axial cavities 31 and 31' respectively which communicate with cavity 30. Between the heads 33 and 33' of pivot members 13 and 13' respectively, the conduit members 34 and 34' communicating individually with tubes 35 and 36, are clamped. The interiors of members 34 and 34' communicate with cavities 31 and 31' respectively, through radial bores 32 and 32' in pivot members 13, 13'. Tubes 35 and 36 communicate with a refrigerating unit which is diagrammatically illustrated in Fig. 5 and conduct a coolant to and from cavity 30 for cooling the drill stock 12 and the drill. The refrigerating unit is preferably accommodated in the column of the dental drill apparatus and is operated by water pressure.

The refrigerating device consists essentially of a closed tank 37 with a central vertical dividing wall 38 which is provided with an opening 39 by which the two compartments 41, 42 of the tank communicate with each other and which can be closed by means of a flap valve 40. One compartment, 41, contains a refrigeration medium, for example, a mixture of ammonium nitrate and water in equal parts, or six parts of sodium sulphate, five parts of ammonium nitrate and four parts of diluted nitric acid. A tube 46 extending through the top of the tank 37 is provided with a flap valve 44, its other end, in the shape of a U, being immersed in the refrigeration medium. A press water conduit 47 extending into chamber 42 ends inside a water jet pump 48. Cooling of the drill-stock is effected through tubes 35 and 36 which are connected to the coiled cooling pipe 49 of the refrigerating device in compartment 41. The coolant flows in a closed circuit through coil 49, the tube 35, the cavity 30 in the swivelled drill-stock and back to coil 49 through the tube 36. Preferably alcohol or air is used as coolant. The coolant is circulated by means of a pump 50 operated by a small turbine 51 driven by a press water jet 52. The refrigerating device operates as follows: A valve 53 is turned on and the water will flow through pipe 47 and to jet 52. A vacuum will be produced in compartment 42 by the water jet pump 48 and the turbine 51 set in motion. Flap 40 opens automatically a passage 39 between chambers 41 and 42 and a vacuum is communicated to the compartment 41. As a result the refrigeration medium evaporates. This process is quickened by fine air bubbles passing through the refrigerant from the pipe 46 under the higher pressure of the outside air. The vapor exhausts through an outlet tube 54, due to the action of the water jet pump 48. The temperature of the refrigeration medium will fall to between −15° and −20° C. and consequently the temperature of the coolant will fall to between −12° and −15° C. This fluid absorbs the heat produced by the drill on reaching the collet 11, but gives it up again to the refrigeration medium on passing through coil 49. Pump 50 produces a suction in conduit 36 and no fluid escapes, on the contrary, air is sucked in in case there is any leakage between the collet 11 and the drill-stock 12. This is a considerable advantage over conventional dental drill cooling devices in which a refrigeration medium is fed at a very high pressure (up to 60 atm.) into the drill head through a spray nozzle which vaporizes it and directs it against the parts in which the drill revolves. When the apparatus is at rest, valve 44 closes automatically and prevents any bad smell and harmful gases from escaping into the air.

Referring to Figs. 1 to 4 attention will now be called to a locking device for the drill contained in the collet 11 and for the swivel drill-stock 12 in the drill head. An annular groove 60 is provided in the drill shank 10 into which, when the drill is inserted, a lock member 61 guided in a suitable recess in the drill-stock 12 will engage. Member 61 is pressed against the drill shank 10 by a spring 62 bearing against the inside of casing 14. Lock member 61 has an extension 63 projecting from the drill-stock into a recess 64 of a slide member 65. The latter is fastened, by means of screws 66, to a pin 67 which slides longitudinally in a corresponding bore of the drill-stock 12. A number of holes 68 disposed on a circle concentric with the swivel axis of drill-stock 12 are provided in casing 14, into which holes one end of the pin 67 can be selectively inserted. On such insertion the drill-stock 12 is locked against swivelling. The drill-stock can be unlocked by pushing the slide member 65 together with the pin 67 in the direction of the arrow A in Fig. 3. Upon movement of member 65 with pin 67 in the direction of arrow B the end of the pin moves into a hole 68 and a shoulder 69 of the aforementioned recess of the slide contacts the projecting portion 63 of the lock member 61 and causes the latter to move against the action of spring 62. As a result the member 61 leaves the annular groove 60 in the drill shank 10, allowing the drill to be taken out of the collet 11. Upon movement of the slide 65 in the direction A, the spring 62 pushes the lock member into the annular groove 60 of the shank of the drill whereby the latter is held firmly against axial movement in collet 11. At the same time the drill-stock 12 becomes unlocked and free to swivel.

The shank 10 and therewith the drill is prevented from turning within the collet 11 by shaping the bottom end of the shank so as to fit to a corresponding shoulder 70 at the base of the collet. The collet is held against axial displacement by means of a nut member 72 screwed into the drill-stock 12 and serving, in addition, to protect the mechanism from dust.

The dentist may regulate the cooling of the drill with one finger of the hand grasping the appliance by manipulating a control valve 73 provided in tube 36 and mounted in the handle portion of the drill, as shown in Fig. 4. This does not affect the continued operation of the refrigerating unit. The tubes 35 and 36 extend along the inside and outside of a hollow tube member carrying the live spindle, the end of which member is shown in Fig. 1. In the device according to the invention the cooling fluid is fed through the pivots about which the drill-stock swivels. This makes it possible to swivel the drill head without having to shut off the coolant.

What I claim is:

1. In a drilling appliance, in particular for dental work, a case, a swivel drill-stock rotatably mounted on said case, a rotatable collet contained in said swivel drill-stock, a drill held in said rotatable collet, a first toothed wheel mounted on said rotatable collet on that side of the swivelling axis of said swivel drill-stock which lies opposite to the cutting end of said drill, a second toothed wheel mounted on said case to revolve about the swivelling axis of said swivel drill-stock, in driving connection with said first toothed wheel, a live spindle, and an intermediate gear mounted on said case and provided with two toothed rims, the one rim meshing with said second toothed wheel, and the other rim being in driving connection with said live spindle.

2. In a drilling appliance, in particular for dental work, a case, a swivel drill-stock comprising a groove, hollow pivots with their hole running into said groove, adjusted to mount said swivel drill-stock rotatably on said case, a rotatable collet contained in said swivel drill-stock and surrounded by said groove, a drill held in said rotatable collet, a first toothed wheel mounted on said rotatable collet on that side of the swivelling axis of said swivel drill-stock which lies opposite to the cutting end of said drill, a second toothed wheel mounted on said case to revolve about the swivelling axis of said swivel drill-stock, in driving connection with said first toothed wheel, a live spindle in driving connection with said second toothed wheel, a refrigerating device, and feed conduits connecting said refrigerating device with said groove through said hollow pivots.

3. In a drilling appliance, in particular for dental work, a case, a swivel drill-stock comprising a groove, hollow pivots with their hole running into said groove, adjusted to mount said swivel drill-stock rotatably on said case, a rotatable collet contained in said swivel drill-stock and surrounded by said groove, a drill held in said rotatable collet, a first toothed wheel mounted on said rotatable collet on that side of the swivelling axis of said swivel drill-stock which lies opposite to the cutting end of said drill, a second toothed wheel mounted on said case to revolve about the swivelling axis of said swivel drill-stock, in driving connection with said first toothed wheel, a live spindle in driving connection with said second toothed wheel, a refrigerating device comprising, a container containing an evaporating refrigeration medium, a cooling pipe in said container, dipping in said evaporating refrigeration medium, a suction pump connected to said cooling pipe, and feed conduits connecting said cooling pipe with said groove through said hollow pivots.

4. In a drilling appliance, in particular for dental work, a case, a swivel drill-stock rotatably mounted on said case, a rotatable collet contained in said swivel drill-stock, a drill held in said rotatable collet, a first toothed wheel mounted on said rotatable collet on that side of the swivelling axis of said swivel drill-stock which lies opposite to the cutting end of said drill, a second toothed wheel mounted on said case to revolve about the swivelling axis of said swivel drill-stock, in driving connection with said first toothed wheel, a live spindle in driving connection with said second toothed wheel, a pin slidably guided in said swivel drill-stock, a slider fixed to said pin, holes in said case, lying on a circle concentric to the axis of swivelling of said drill-stock, said pin being adjusted for the sake of locking and unlocking said drill-stock to be inserted in or taken out of said holes by manipulation of said slider.

5. In a drilling appliance, in particular for dental work, a case, a swivel drill-stock rotatably mounted on said case, a rotatable collet contained in said swivel drill-stock, a drill held in said rotatable collet, a first toothed wheel mounted on said rotatable collet on that side of the swivelling axis of said swivel drill-stock which lies opposite to the cutting end of said drill, a second toothed wheel mounted on said case to revolve about the swivelling axis of said swivel drill-stock, in driving connection with said first toothed wheel, a live spindle in driving connection with said second toothed wheel, a catch guided in said swivel head-stock and adjusted to hold said drill in said collet, a pin slidably guided in said swivel drill-stock, a slider fixed to said pin and provided with a recess into which said catch penetrates, holes in said case, lying on a circle concentric to the axis of swivelling of said drill-stock, said slider being adjusted in such a way that when it is manipulated so as to bring it out from a central position in one direction, a wall of said recess controls said catch so as to release said drill, whereas said pin continues to slide in one of said holes, and that when it is manipulated in the opposite direction said pin comes out of its hole to release said swivel drill-stock without influencing said catch.

OSKAR STALDER.

REFERENCES CITED

The following references are of record in the file of this patent:

UNITED STATES PATENTS

| Number | Name | Date |
| --- | --- | --- |
| 493,289 | Peck | Mar. 14, 1893 |
| 553,124 | Meister | Jan. 14, 1896 |
| 600,243 | Case and Shaw | Mar. 8, 1898 |

FOREIGN PATENTS

| Number | Country | Date |
| --- | --- | --- |
| 486,253 | Great Britain | June 1, 1938 |